F. L. RAPSON.
LIFTING JACK FOR MOTOR AND OTHER VEHICLES.
APPLICATION FILED APR. 12, 1918.
1,398,279. Patented Nov. 29, 1921.
6 SHEETS—SHEET 1.
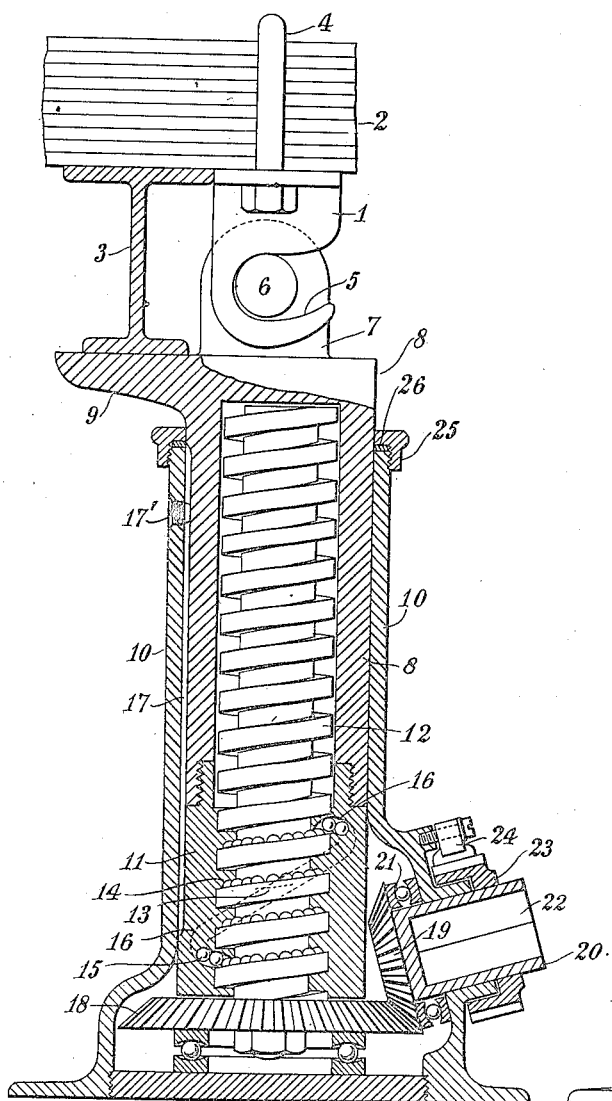
INVENTOR
F. L. RAPSON

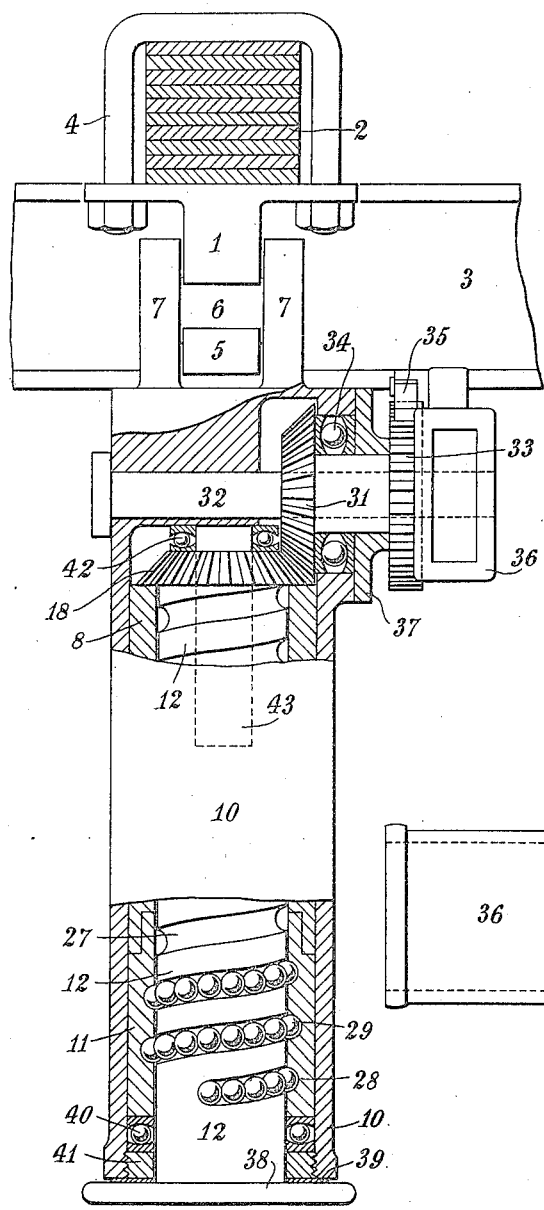
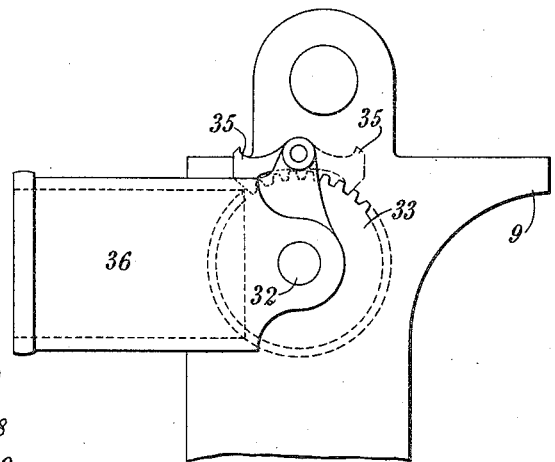

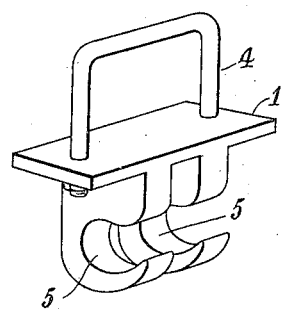
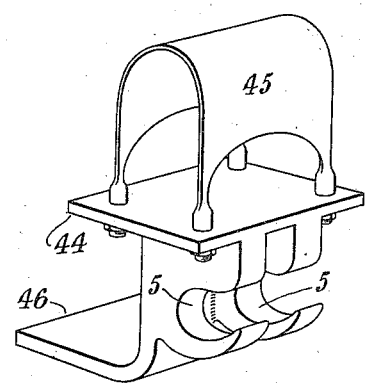
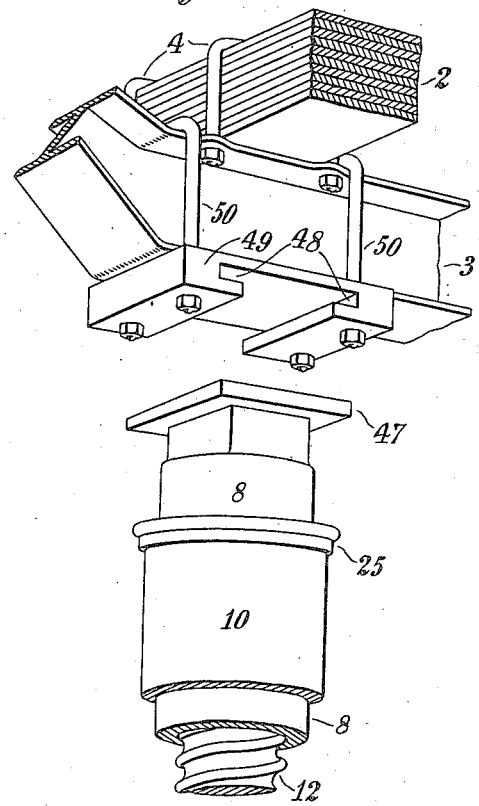

F. L. RAPSON.
LIFTING JACK FOR MOTOR AND OTHER VEHICLES.
APPLICATION FILED APR. 12, 1918.
1,398,279.
Patented Nov. 29, 1921.
6 SHEETS—SHEET 6.
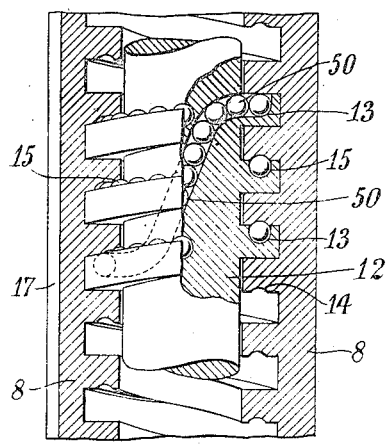
Fig. 10.
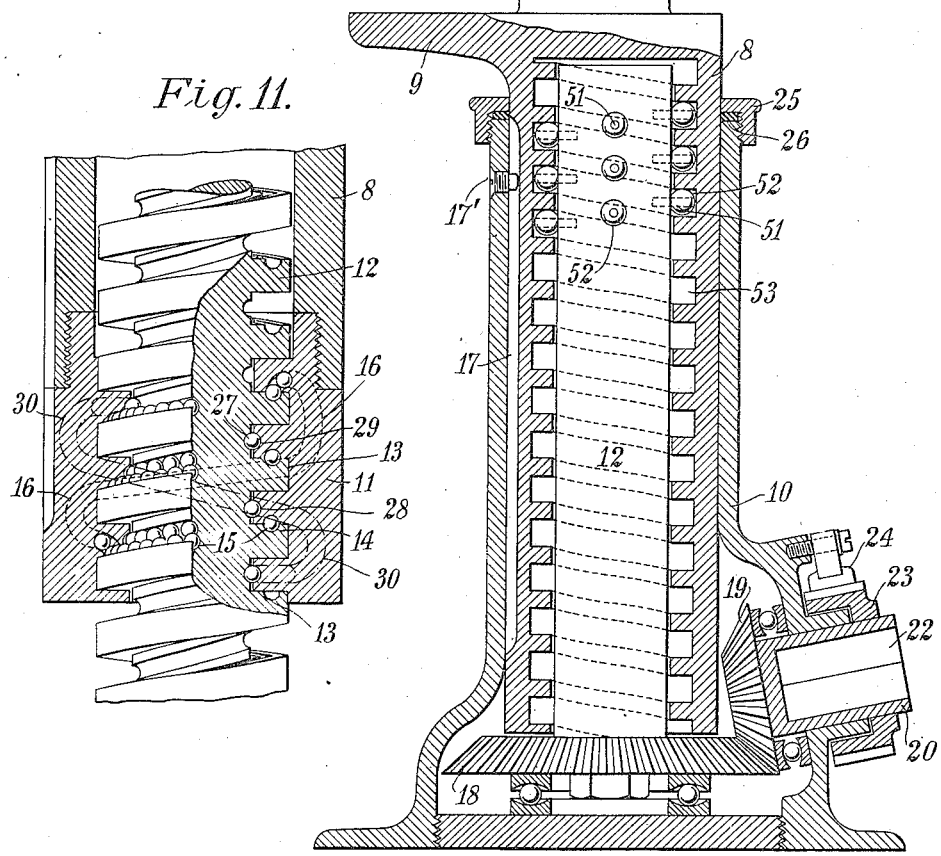
Fig. 11.
Fig. 12.
INVENTOR
F. L. RAPSON

UNITED STATES PATENT OFFICE.

FREDERICK LIONEL RAPSON, OF LIVERPOOL, ENGLAND.

LIFTING-JACK FOR MOTOR AND OTHER VEHICLES.

1,398,279.  Specification of Letters Patent.  Patented Nov. 29, 1921.

Application filed April 12, 1918. Serial No. 228,100.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks for Motor and other Vehicles, of which the following is a specification.

This invention relates to improvements in lifting jacks and the like for use on motor road and other vehicles.

The invention has for its object to provide on a motor road vehicle such as a motor car and adjacent to one or more of the wheels, a device to which may be permanently or detachably hinged or connected a lifting jack which is adapted to be operated by a suitable handle, wheel, lever, or the like so that the weight of the car can be taken off each wheel to relieve the tires when in the garage, or to jack the car up when it is desired to repair punctures or effect other repairs, or to raise the car for washing or inspection purposes.

A further object is to so arrange the jacks on the vehicle that they will occupy a small space and be screened from view when in their inoperative position. A further object is to provide attachment means adjacent to each wheel so that a single jack can be instantly attached to or be detached from, the said means.

A further object is to provide anti-friction means in the jack element to enable the vehicle or a part thereof to be raised or lowered with the minimum effort.

With these and other objects in view the invention consists chiefly in providing adjacent to each wheel a device to which may be detachably or permanently hinged or connected a self contained jack element.

The invention will now be described with reference to the accompanying drawings in which, Figure 1 is a sectional side elevation showing the improved jack in its operative position under the axle of a vehicle;

Fig. 2 is a front elevation, and

Fig. 5 is a sectional front elevation of a modified form of jack in its operative position under the axle of a vehicle; and Fig. 6 is a part side elevation thereof;

Fig. 7 is a perspective view of one form of hook for attachment to the vehicle spring;

Fig. 8 is a modified form of hook for attachment to the rear axle of a vehicle.

Fig. 9 is a perspective view of a further modified form of attachment means;

Fig. 10 is a sectional elevation of a thrust thread shown in Fig. 1 the circulation of the balls being arranged through the shaft;

Fig. 11 is a sectional elevation showing a combined thrust and anti-friction thread and Fig. 12 is a sectional elevation of part of a jack showing a further modified form of anti-friction thread.

Figure 3:
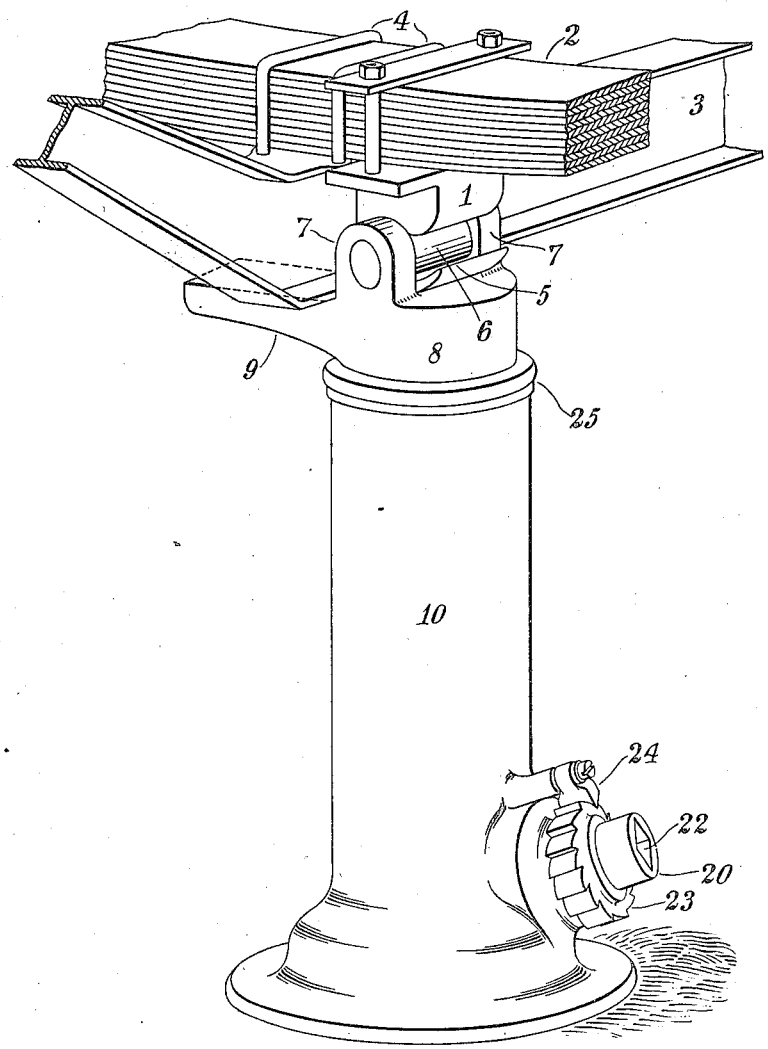
Fig. 3 is a perspective view thereof.

As shown more particularly in Figs. 1, 2, 3 and 7 one element 1 of a hinged joint is secured to the outer portion of each laminated spring 2 of the vehicle adjacent to the axle 3 thereof by U-shaped bolts 4 disposed over the spring 2 or by bolts and plates on the upper side of the said spring. This element 1 of substantially inverted U shape, is formed with a pair of hooks or curved recesses or slots 5 into which are adapted to be placed the outwardly projecting pins 6 formed or provided on a lug or extension 7 of the sleeve member 8 of a jack element so that the latter may be turned to its operative or vertical position. The sleeve member 8 is also provided with a lug or extension 9 to engage under the axle 3 of the vehicle when in position.

The jack element comprises a substantially cylindrical casing 10 in which is slidably mounted the sleeve member 8 having at its lower end an internally screw threaded block or nut 11. Within the sleeve member 8 and nut 11 is rotatably mounted a rod 12 cut with a deep square thread to coöperate with the thread cut in the block or nut 11. A semicircular or other shaped groove 13 is cut on the upper side of the thread on the rod 12 and a similar coöperating groove 14 is cut in the under side of the thread in the nut 11. Within the grooves 13 and 14 are disposed a number of anti-friction balls or the like 15. The outer ends of the groove 14 in the nut 11 are connected by a through channel 16 to provide for the circulation of the balls 15.

It will be seen from Fig. 1 of the drawings that where the balls 15 enter or leave the rod 12 or the nut 11 the ball races or grooves are inclined and cut deeper so that the balls 15 do not project above or within the side of thread. The balls 15 in the other portion of the ball race may be sunk above their centers, preferably to a depth of about three quarters of their size. If desired rollers may be provided in place of balls between the coöperating faces.

The sleeve 8 is preferably provided with a slot 17 to receive the inner projecting end of a screw 17' threaded into the casing 10 to guide the vertically movable portion of the jack. A bevel wheel 18 is secured on the lower end of the rod 12 which is adapted to be rotated by another bevel wheel 19 secured on an angularly arranged transverse shaft 20. This shaft 20 is rotatably mounted in the base of the casing 10 and a suitable thrust bearing 21 is provided between the casing 10 and the said bevel wheel 19. The shaft 20 is formed with a squared or other suitably shaped hole or recess 22 for the reception of the squared or other suitably shaped end of an operating handle or the like. This handle is preferably of T shape and when of considerable length may be constructed in any suitable manner, to fold up neatly. On the outer end of the shaft 20 is preferably secured a ratchet wheel 23, and a pawl 24 is pivoted on the casing 10 to engage with the said ratchet wheel 23 so that the jack can be raised and the lowering prevented until the said pawl 24 is placed out of engagement. The jack is preferably lowered by turning the detachable handle in the opposite direction when the pawl 24 is disengaged. The casing 10 is rendered dust proof by screwing on the upper end thereof an annular cover plate 25, a suitable washer 26 being disposed between the upper end of the casing 10 and the cover plate 25.

The bearing which receives the short inclined shaft 20 is provided with an annular flange or extension having interior and exterior bearing faces, and the ratchet wheel 23 is provided with an annular recess into which the bearing flange extends and the said ratchet wheel is arranged on the exterior bearing surface of the said flange. The ratchet wheel 23 and the pinion 19 maintain the short inclined shaft in proper position in the bearing.

In operation, and when a hook device 1 is secured adjacent to each wheel, in the manner previously described, the jack element which may be stored away in any convenient part of the car, is placed on the hook adjacent to the wheel it is desired to raise. When the jack device is hooked on, the weight thereof swings the jack to a vertical position and the lug or extension 9 thereon under the axle 3 and thus enables the driver to instantly put the jack in position without groveling under the axle 3 to find a firm place. The jack can now be operated by inserting the squared end of the handle in the squared recess 22 in the spindle 20 and rotating the same. This rotation will turn the rod or shaft 12 through the medium of the bevel wheels 19 and 18 and raise the sleeve and the end of the axle and the adjacent wheel from the ground so that repairs can be executed. The wheel may be lowered preferably automatically by raising the pawl 24 out of engagement with the ratchet wheel 23, or by rotating the handle in the opposite direction as will be well understood. The jack can now be hooked off the axle 3 and stored in any convenient place on the car, or it can be turned on its swivel connection and be secured to the spring or chassis by a strap, a spring clip or by other suitable means.

In the construction shown in Fig. 3 the top of the sleeve 8 is formed with a pair of lugs 7 adapted to carry the swivel pin 6 which is adapted to engage a single hook 5 depending from the element 1.

Figure 4:
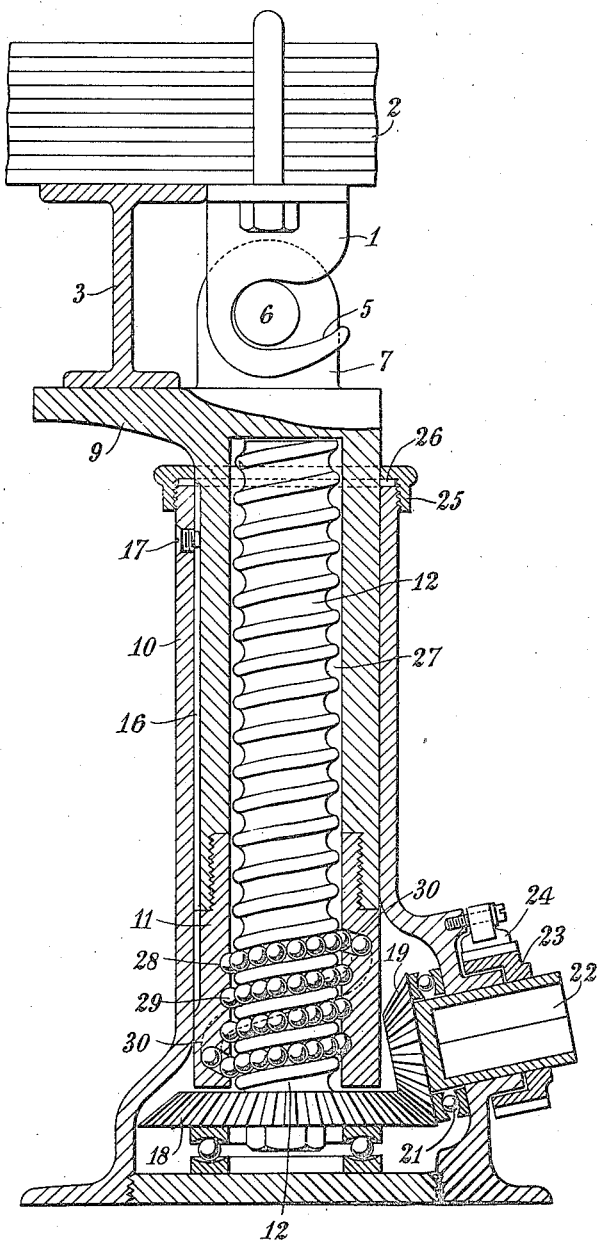
Fig. 4 is a similar view to that shown in Fig. 1 of a modified form of jack.

In a modified form of anti-friction screw thread for a jack element as shown in Fig. 4 the rod 12 is formed with a helical semicircular groove 27 and a similar coöperating groove 28 is formed in the nut 11. Within the grooves 27 and 28 are privided antifriction balls or the like 29 to form the screw thread. The outer ends of the groove 28 in the nut 11 are connected by a through channel 30 to provide for the circulation of the balls 29. In this construction the jack could be automatically lowered by placing the pawl 24 out of engagement with the ratchet wheel 23.

In a modified form of jack element as shown in Figs. 5 and 6 the internal screw threaded nut 11 or sleeve extension 8 thereon is provided or formed at its upper end with the bevel wheel 18 which is adapted to mesh with another bevel wheel 31 mounted on a transverse shaft or spindle 32. This bevel wheel 31 is formed in one with or connected to a ratchet wheel 33 freely mounted on the said spindle 32, suitable anti-friction ball bearings 34 being provided if desired.

The ratchet wheel 33 is adapted to be actuated through the medium of a pawl 35 by reciprocating a hand lever mounted on said spindle 32. The pawl 35 is mounted on the said lever or on a casing 36 into which the end of the said operating lever is adapted to be placed when a detachable hand lever is required. The pawl 35 on the ratchet 33 is so arranged that it may be reversed to engage the ratchet 33 for lifting or for lowering the jack.

Upon the casing 10 and at right angles to the lug 37 carrying the spindle 32 is formed or provided the lug or extension 9 of considerable strength which is adapted to engage under the axle 3 of the vehicle when the jack is in its vertical and operative position as previously described. Within the rotatable nut 11 is mounted the screwed rod 12 formed with an enlarged flanged base or footstep 38 which is adapted to engage the ground when in its operative position. The flange 38 on this rod 12 is adapted to contact, when in its normal or raised position, with the lower end of the jack casing 10 and a suitable washer or the like 39 is provided on the upper side of the flange 38 to prevent the entry of dust and dirt and also act as a buffer or cushion when the screwed rod 12 is moved upward. A suitable thrust bearing 40 is provided between the nut 11 on the lower end of the sleeve 8 and a closing ring 41 is screwed into the lower end of the casing 10 and another thrust bearing 42 is provided at the upper end of the casing 10 between the upper side of the bevel wheel 18 on the sleeve 8 and a bearing formed in the top of the casing 10. A depending rod 43 is formed on this bearing to guide the screwed rod 12.

In this construction the top of the casing 10 is formed with a pair of lugs 7 adapted to carry the swivel pin 6 which is adapted to engage with a single hook 5 depending from the element 1.

If desired jacks constructed as previously described can be permanently secured by a swivel connection to each axle 3 or to each of the springs 2 thereon adjacent to the wheels, and the jacks may be so arranged that their lower ends may be detachably secured to the outward portions of the wheel springs 2 by clips or other means when in their inoperative position as will be well understood.

In order that the improved jacks above described may be fitted to the rear axle of a vehicle I provide a fitting shown in Fig. 8. In this construction a plate 44 carrying the pair of hooks 5 is connected to the rear axle by an embracing strap plate 45 and a flanged extension 46 is provided on the underside of the plate 44 to take the place of the front axle 3. Thus the hook element on the rear axle is approximately at the same height from the ground as the element 1 on the front axle.

In a further modified construction of the jack attachment means as shown in Fig. 9 the upper end of the jack is formed with a head 47 which is adapted to slide in rabbets 48 formed in the underside of a plate 49 adapted to be secured to the axle 3 of the vehicle by U shaped bolts 50. The front end of the head 47 is beveled to allow it to enter the rabbets 48 easily and the said head 47 is adapted to fit loosely in the rabbets so that it can be placed in position when one of the wheel tires is flat and the axle is out of parallel with the ground. Alternatively the plate 49 could be secured to the top of the jack to engage with the head 47 secured to the vehicle. In the anti-friction screw threads for the jacks previously described it will be seen that either the sleeve or nut 11, or the screwed rod 12 is rotated. When the nut 11 is rotated the balls or rollers are returned through a channel in the nut, but it will be understood that the balls or rollers could be returned through the rod 12 when this latter is rotated; thus a running ball race is provided.

Referring to Fig. 10 which illustrates a running thrust race similar to that shown in Fig. 1 the shaft 12 is formed with an interior channel 50 for the circulation of the balls 15.

In a further modified form of anti-friction thread as shown in Fig. 11, I provide a running ball and thrust race by combining the running ball race with the running thrust race previously described. In this instance a deep thread is cut in the shaft 12 and nut 11 and the balls 29 are placed in the coöperating semi-circular grooves 27 and 28 and circulate through the channel 30 as described for the previous construction. In addition to this a helical semi-circular groove 13 is cut in the side of the thread in the shaft 12, and a coöperating groove 14 is formed in the interior thread in the nut 11. Within these coöperating grooves 13 and 14 is disposed a number of anti-friction balls 15. These latter balls 15 are adapted to return and circulate through a second channel 16 formed in the nut or block 11 or the two sets of balls 15 and 29 could be returned through the shaft 12 when the nut 11 is rotated.

In a further modified form of anti-friction thread as shown in Fig. 12, the rod or shaft 12 is provided at its upper end with a plurality of outwardly projecting pins 51 arranged in a helical manner on the side thereof. On each of these pins 51 is rotatably mounted a roller, cone or ball 52 so that they may freely revolve on the said pins 51. Surrounding the shaft 12 is slidably mounted a sleeve, block or the like 8 provided internally with a helical groove 53 of any convenient shape to receive the balls or the like 52 on the outwardly projecting pins 51 on the rod or shaft 12. If desired, the under side of the groove or thread 53 could be shaped or grooved to receive a portion of the freely rotating balls 52. The sleeve 8 is slidably mounted in the casing 10, and the shaft 12 is rotated by a handle through the medium of bevel wheels 18 and 19 disposed in the base of the said casing 10. The upper end of the sleeve or block 8 is provided or formed with an outwardly extending lug 9 to engage under the axle 3 of the vehicle and with one element or portion of a hook attachment to coöperate or engage with the other portion secured to the under-side of the vehicle spring adjacent to the said axle as previously described.

In operation, the shaft is rotated by the handle or other suitable means through the medium of the bevel wheels. This action will cause the balls 52 to rotate on their spindles 51, move the sleeve 8 upwardly and thereby raise the axle 3 of the vehicle in a free and easy manner.

In a slightly modified construction the helical grooves 53 are formed on the shaft 12 and the balls 52 are arranged on pins 51 inwardly projecting from the sleeve 8.

If desired, a number of isolated sets of balls 52 may be arranged along the shaft 12 or the sleeve 8. Each set preferably consists of twelve balls arranged helically at radial distances of approximately 90°.

What I claim is:—

1. A lifting jack for use on motor and other vehicles, and means including a pintle and an open hook for detachably hinging the lifting jack to the vehicle in position to swing automatically by gravity beneath the axle of the vehicle, whereby the jack may be applied to either end of either axle for elevating the wheel and may be removed and carried in the vehicle after use.

2. A lifting jack for motor and other vehicles, and means for detachably hinging the lifting jack to the vehicle in position to swing by gravity beneath the axle of the vehicle, said means including spaced open hooks carried by the vehicle, a lug projecting from the lifting jack and fitting between the spaced hooks and provided with a laterally projecting pintle arranged in the said hooks and movable into and out of the open hooks to engage and disengage the lifting jack with the hinging means.

3. A lifting jack for motors and other vehicles including a casing having an offset lower portion at one side provided with an annular bearing flange set at an inclination and having interior and exterior bearing faces, a sleeve operating in the casing and provided with a nut, a helically grooved rod extending into the sleeve and coacting with the nut to raise or lower the sleeve when the rod is rotated, a gear mounted on the lower end of the rod, a short inclined shaft journaled in said bearing flange and provided at its inner end with a pinion meshing with the said gear, a ratchet wheel mounted on the outer portion of said shaft and recessed to receive the bearing flange and arranged on the outer surface thereof, and an exterior pawl mounted on the offset portion of the casing and engaging the ratchet wheel.

4. A lifting jack for use on motor and other vehicles, and means for detachably connecting the lifting jack to the vehicle including a substantially hook shaped supporting portion or member forming a recess and carried by the vehicle, and a projecting portion projecting substantially horizontally from and carried by the lifting jack and arranged in the said recess, said projecting portion being movable into and out of the recess to connect the lifting jack with and disconnect the same from a vehicle without the removal of the fastening devices.

5. A lifting jack for use on motor and other vehicles and means for detachably connecting the lifting jack to the vehicle including spaced substantially hook-shaped side portions or members forming opposite recesses and carried by the vehicle, and laterally projecting portions carried by the lifting jack and arranged in said recesses and movable into and out of the same to connect the lifting jack with the vehicle and disconnect the said lifting jack therefrom without the removal of the fastening devices.

In testimony whereof I have hereunto signed my name.

FRED. LIONEL RAPSON.